United States Patent [19]

Huignard et al.

[11] Patent Number: 4,492,468
[45] Date of Patent: Jan. 8, 1985

[54] INTERFEROMETER FOR THE REAL TIME DISPLAY OF DEFORMATIONS OF VIBRATING STRUCTURES

[75] Inventors: Jean-Pierre Huignard; Jean-Pierre Herriau; Abdellatif Marrakchi El Fellah, all of Paris, France

[73] Assignee: Thomson-CSF, Paris, France

[21] Appl. No.: 321,701

[22] Filed: Nov. 16, 1981

[30] Foreign Application Priority Data

Nov. 25, 1980 [FR] France ............................... 80 24966

[51] Int. Cl.³ .............................................. G01B 9/029
[52] U.S. Cl. ...................................... 356/347; 350/3.64
[58] Field of Search ............... 356/347, 348; 350/3.64, 350/3.81

[56] References Cited

U.S. PATENT DOCUMENTS 4,284,324 8/1981 Huignard et al. .................. 350/3.64
4,304,458 12/1981 Huignard et al. .............. 356/347 X

FOREIGN PATENT DOCUMENTS 2385079 10/1978 France .
2416452 8/1979 France .

OTHER PUBLICATIONS

Huignard et al., "Real-Time Double-Exposure Interferometry . . . ", *Applied Optics*, vol. 16, No. 7, pp. 1807–1809, Jul. 1977.

Huignard et al., "Time Average Holographic Interferometry . . . ", *Applied Optics*, vol. 16, No. 11, pp. 2796–2798, Nov. 1977.

Huignard et al., "Phase Conjugate Wavefront Generation . . . ", *Optics Letters*, vol. 4, No. 1, pp. 21–23, Jan. 1979.

Marrakchi et al., "Application of Phase Conjugation in $B_{12}SiO_{20}$ Crystals . . . ", *Optics Communications*, vol. 34, No. 1, pp. 15–18, Jul. 1980.

Huignard et al., "Speckle-Free Imaging . . . ", *Optics Letters*, vol. 5, No. 10, pp. 436–437, Oct. 1980.

*Primary Examiner*—Davis L. Willis
*Assistant Examiner*—Matthew W. Koren
*Attorney, Agent, or Firm*—Cushman, Darby & Cushman

[57] ABSTRACT

Display device in which an interferometric hologram corresponding to the vibrations of the object is recorded in a photosensitive electrooptical material. The corresponding interferogram is collected on the directly transmitted object beam by the recording material.

10 Claims, 8 Drawing Figures

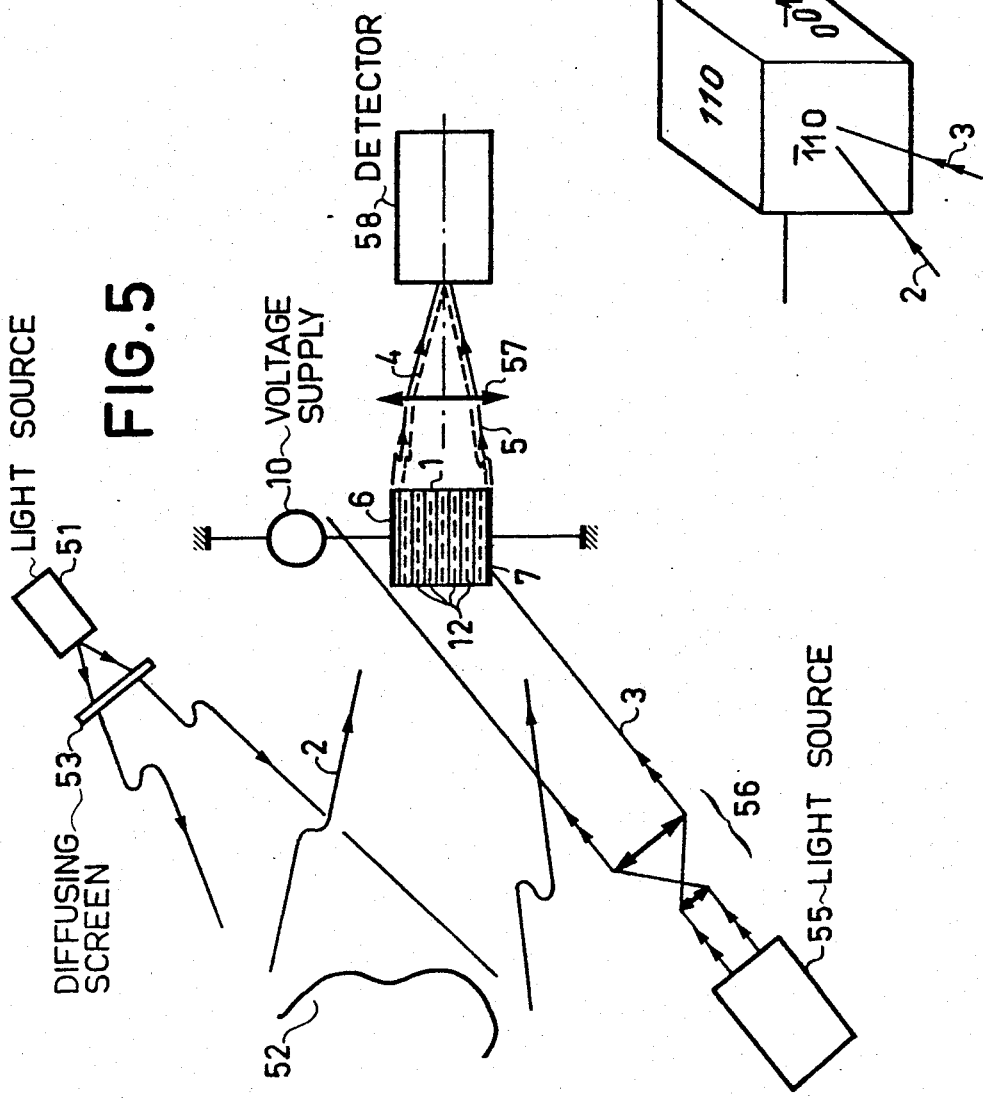

INTERFEROMETER FOR THE REAL TIME DISPLAY OF DEFORMATIONS OF VIBRATING STRUCTURES

BACKGROUND OF THE INVENTION

The present invention relates to devices for the real time display by holographic interferometry of deformations of vibrating or deformable structures.

In numerous fields, it is useful to be able to carry out a non-destructive control or inspection on stressed mechanical parts. In the case of slow deformations, it is known to use devices based on conventional holography, observation being made possible by the memory effect inherent in the holographic media. The recording of two successive wave fronts with the same reference beam and the restoration by this reference beam of the recorded fringes makes it possible to create an interference pattern corresponding to the deformations. The localization of the fringes is directly linked with the deformations occurring between the recorded states. High resolution photographic supports are used as the recording medium, but they require chemical developing and a very precise repositioning, and, particularly in the case of vibrating structures, it is not possible to follow the deformations of the structures.

To provide a solution to this problem, it is known to use as the recording medium photosensitive electrooptical materials such as bismuth and silicon oxides (BSO) or bismuth and germanium oxide (BGO). In the case of such materials, the network of fringes created by the interference of the wave front coming from the object and the reference wave front induces in real time, to within the recording time of the material, a system of index layers constituting a hologram characterizing the object wave front. It diffracts part of the energy of the incident reference wave front in accordance with a diffracted wave, whose wave front is isomorphic of the object wave front. On replacing a mirror perpendicular to the path of the reference wave transmitted by the crystal in order to reflect said reference wave onto the crystal, the system of index layers inscribed in the crystal gives rise to a conjugate wave of the object wave on the basis of said reflected reference beam.

Such a property is used in the construction of a device for the display of deformable structure deformations by holographic interferometry. This device forms the subject matter of French patent application No. 7,708,627 filed on Mar. 23, 1977.

This device is used either for revealing the slow deformation of an object between two exposures or for studying the rapid vibrations of an object or part of an object. In the latter case, if the recording material exposure recording time is long compared with the vibration cycle and if the maximum amplitude $\Delta e$ of the deformation does not exceed a few dozen times the radiation wavelength $\lambda$, the image obtained then corresponds to the image of the object to be analysed modulated by black fringes corresponding to the zeros of the Bessel function $$J_0^2\left(\frac{4\pi}{\lambda}\Delta e\right).$$

This device functions by retroreflection of the reference wave, generation of the conjugate wave front in the recording material and separation of this conjugate wave front from the incident object wave front by means of a semi-transparent plate. The reference wave consequently passes into the crystal twice and bearing in mind the absorption coefficients at the wavelengths used of about 500 nm, an optimum material thickness of about 2 mm is obtained.

However, such a device does not make it possible to observe interferograms of vibrating objects larger than 6 or 7 cm. The essential limitation is the energy available in the image plane generated by the conjugate wave front. This is in fact the energy of the retroreflected reference beam fraction diffracted by the photoinduced index system and the higher the modulation factor m of the fringes the higher the diffraction efficiency and it is in fact proportional to the square of m.

However, the modulation factor of the fringes is dependent on the ratio of the interfering beams. In the envisaged application, this ratio is approximately $10^{-3}$ to $10^{-4}$, corresponding to an extremely low modulation factor of the fringes of approximately $2\times 10^{-2}$. Compared with a modulation factor of 1, the energy available in the image is much lower by a factor of $4\times 10^{-4}$. Another consequence of the low modulation factor is that the recording time is longer. To obtain interferograms of diffusing objects, it is also necessary to have optimum conditions with regards to the quality of the crystal, the planarity of the reference wave, the crystal faces, etc.

Attempts have been made to obviate these disadvantages for obtaining interferograms of large 3D objects without it being necessary to perfect the operating conditions, by using wave coupling phenomena in thick photosensitive supports, such as the BSO monocrystal.

Physically, wave coupling leads to a significant energy transfer from the reference beam to the object beam after passing through the crystal. The directly transmitted object beam intensity is in practice increased by a factor of 2 to 3 in the presence of a reference beam which, under these conditions, acts as a pumping wave.

Thus, under these conditions, it is possible to discern the interferogram of the object on the path of the object beam emerging from the recording medium without being excessively disturbed by the radiation directly transmitted by the object. This leads to a significant simplification to the device by eliminating the shutters or mirrors which are indispensible in the prior art device operating by generation of the conjugate wave front.

BRIEF SUMMARY OF THE INVENTION

The present invention relates to an interferometer for the real time display of the deformations of a vibrating structure, wherein it comprises a photosensitive electrooptical recording material in which is recorded in volume and in real time, to within a time constant characteristic of the material, an interferometric hologram constituted by a fixed system of index layers corresponding to the deformations of this vibrating structure as from the interference in the volume of the material of an incident object radiation diffused by the vibrating structure from an illuminating radiation from a coherent source and a reference radiation coherent thereto, and means for displaying the interferogram of the vibrating structure resulting from the reading of the hologram recorded in the material, said display means collecting the interferogram of the vibrating structure on the object beam from the recording material.

BRIEF DESCRIPTION OF THE DRAWINGS

The invention is described in greater detail hereinafter relative to non-limitative embodiments and the attached drawings, wherein show:

FIGS. 1 to 4 explanatory drawings.
FIG. 5 a diagram of the interferometer according to the invention.

DETAILED DESCRIPTION OF THE PREFERRED EMBODIMENTS

Figure 1:
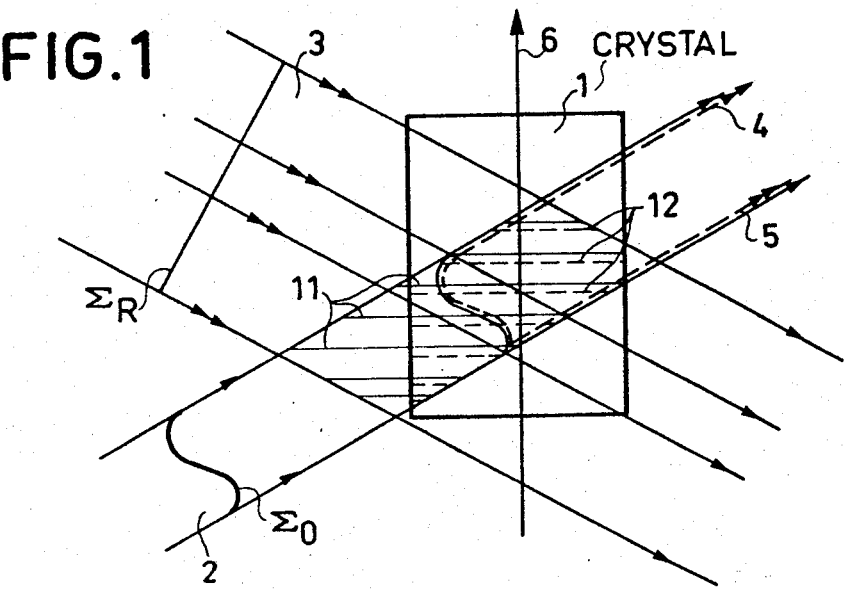
Figure 2:
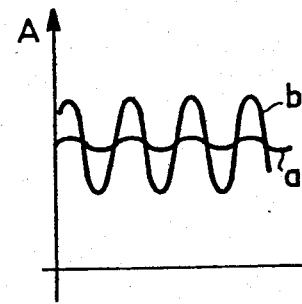

To facilitate the understanding of the interferometer according to the invention, the phenomenon of wave coupling in a photosensitive electrooptical monocrystal is described relative to FIGS. 1 and 2.

In FIG. 1, the case is considered of a fixed diffusing object of random shape from which emanates the object wave 2 of wave front $\Sigma_O$. A thick monocrystal 1, cut from a thermoconductive, electrooptical material, e.g. BSO is placed on the path of object wave 2. In the thickness of the crystal, the object wave interferes with a reference wave 3 with a planar wave front.

The network of interference fringes 11 created in this way generates in real time in the crystal a system of index layers 12, following a recording time $\tau$. This system of layers diffracts part of the energy of reference wave 3 into a diffracted wave 4, whose wave front is isomorphic of the object wave front $\Sigma_O$.

However, in the case of the BSO monocrystal and other identical photosensitive electrooptical crystals, the photoinduced network can be accurately phase-displaced by $\pi/2$ relative to the incident illumination network, so that the diffracted wave 4 is strictly superimposed on the transmitted object wave 5. Everything takes place as if the transmitted object wave were enriched by a fraction of the energy from the reference wave. If the crystal involved in the interference of the two beams is thick, and approximately 1 cm, the transmitted object beam can be considerably intensified by a factor of 2 to 3. On the front face of the crystal, the interference of the two beams is responsible for an intensification of the object beam in accordance with the process described hereinbefore. However, this intensification is very limited because the ratio of the intensity of the object and reference beams on this front face is approximately $10^{-3}$ to $10^{-4}$, so that the modulation factor of the fringes is very low, as is shown at a in FIG. 2.

During propagation in the crystal, this intensified object wave again interferes with the reference beam, which increases the modulation of the fringes and leads to a somewhat larger supply of energy to the object beam. It proceeds in stepwise manner in this way along the thickness of the crystal in which the object and reference beams interfere, because the new photoinduced network is always in phase with the main network, due to the $\pi/2$ phase displacement between the interference network and the index network, or system. On the exit face, the modulation factor of the fringes is higher than on the entrance face, as shown in FIG. 2 at b.

Thus, if the interaction length in the medium is sufficient, it is possible to obtain a significant increase in the intensity of the emerging object beam and in practice the increase is by a factor of 2 to 3. Typically, on bringing the intensity of the incident object beam to 1, the directly transmitted object beam leaves with an intensity of 0.1, due to the absorption in the crystal and the beam diffracted in accordance with said object beam has an intensity of 0.2, which finally represents a significant energy transfer from the reference beam to the object beam.

Figure 3:
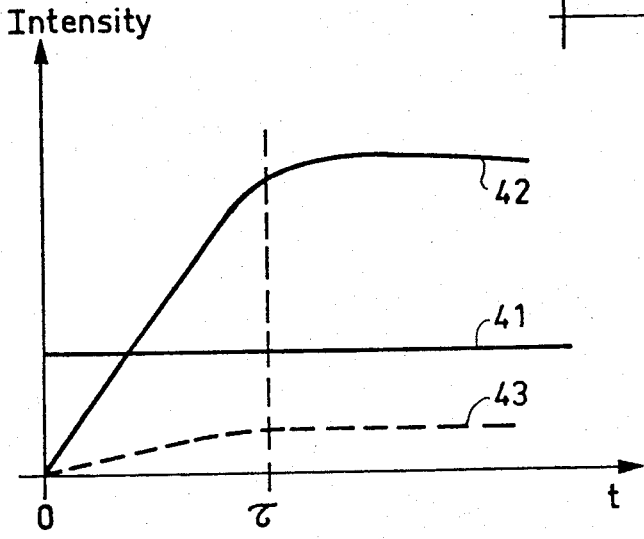

This amplification of the diffracted beam due to the wave coupling in a thick crystal compared with the intensity of the diffracted beam in the prior art device is shown in the diagram of FIG. 3. This diagram shows the intensity as a function of time and line 41 represents the intensity of the directly transmitted object beam in the absence of the pumping beam 3, both in the case of the present invention and in the case of the prior art. This intensity is constant as coming from time 0 when the incident object beam, reaches the BSO crystal.

Curve 42 shows the establishment of the diffracted object beam at the end of time $\tau$ in the case of the present invention, its intensity being two or three times higher than that of the directly transmitted object beam. Curve 43 shows the establishment of the diffracted beam in the case of the prior art device with a low intensity compared with that of the directly transmitted object beam, the energy of these two diffracted beams being in both cases sampled from the reference beam.

Crystal 1 may or may not be exposed to a transverse electric field, as shown by arrow 6 in FIG. 1, the phase displacement of $\pi/2$ between the interference beam and the index system being automatically established. However, the effectiveness of the amplification phenomenon increases in proportion to the level of the electric field applied, which is typically between 10 and 20 kV.cm$^{-1}$.

The saturation inscription or recording of the index system from the interference fringe system is not in fact instantaneous and requires a certain time $\tau$, typically 100 ms and the same applies regarding the erasure of the system. This property makes it possible to use the wave coupling phenomenon in the photosensitive electrooptical thick crystals for the study of vibrating structures, whose vibration cycle T is below $\tau$.

At each instant, a vibrating and diffusing object transmits an object wave, whose wave front differs and more precisely has periodic variations. At each instant, with a delay $\tau$, this object wave records an index system in the crystal with the reference beam. As erasure is not instantaneous, there is in the crystal coexistence of all the diffraction gratings corresponding to all the states of the object.

With the conditions referred to hereinbefore regarding the cycle of the vibrations, the amplitude of the deformations and the wavelength of the radiation, the image obtained corresponds to the image of the object to be analysed modulated by black fringes.

For information purposes, details are given hereinafter of the operating conditions with a BSO monocrystal. With the wavelength $\lambda = 514$ nm, the energy transfer of the reference beam to the object beam is of a significant level for an interaction length of 1 cm. The preferred orientation of the monocrystal relative to the direction of the electric field 6 is that shown in FIG. 4, i.e. the electric field is perpendicular to the faces 001 of the crystal. The incidence of the beams on face 110 or $\overline{1}10$ and which determines the spacing of the fringes is optimum about 20° to 30°, for example at +20° for the object beam and at −20° for the reference beam. The time constant $\tau$ used for the energy transfer from the reference beam to the object beam are substantially independent of the ratio of the intensities of the reference and object incidence beams, $\tau$ varying from 50 to 100 ms when said ratio varies from 1 to 1000. The amplification factor obtained on the transmitted object beam is also independent of the ratio as soon as it exceeds 10 and is a non-linear function of the electric field applied to the crystal when said field exceeds a threshold value of 10 kV.cm$^{-1}$. It is in any case technically difficult to work at above 20 kV.cm$^{-1}$.

Such a medium used under the conditions described hereinbefore is particularly suitable for the realisation of an interferometer for the display of deformations of vibrating structures. The diagram of such a device is shown in FIG. 5. The latter is intended to display the deformations of the vibrating object 52 illuminated by a light source 51 via a diffuser 53. Object 52 rediffuses an object beam 2 towards the recording medium 1. The medium is, for example, a BSO monocrystal having a cubic shape and dimensions $1 \times 1 \times 1$ cm. This crystal is exposed to an electric field of approximately 10 kV.cm$^{-1}$. For this purpose, two electrodes 6 and 7 are disposed on two parallel faces of the crystal and are connected to the two terminals of a voltage generator 10.

A parallel reference beam 3 coherent with the object beam 2 is formed from light source 55 via the beam widener 56 and is transmitted to monocrystal 1. Advantageously, it broadly covers the entry face of the crystal.

A lens 57 is placed on the path of the transmitted object beam 5 and serves to form the image of the object on a detector 58, e.g. a vidicon connected to a television screen or Polaroid camera.

According to the process described hereinbefore, and by means of the conditions referred to regarding the vibration cycle of the object and the amplitude of the deformations, a system of fixed diffraction layers 12 or an interferometric hologram is recorded in the medium and part 4 of the reference beam diffracted by this system and superimposed on the transmitted object beam 5 forms on the entry face of vidicon 58 the interferogram of the vibrating object 52. The image received by detector 58 contains a network of fixed black fringes corresponding to the vibrating parts of the object. This network of fringes is superimposed on a continuous background representing the image of the object formed from the directly transmitted object beam 5. Bearing in mind the amplification by wave coupling along the thickness of the crystal of the diffracted beam 4, the contrast between the interferogram and the continuous background is sufficient for direct transmission detection, which was not the case with the prior art device of French Application No. 77 086 27 where it was either necessary to block off the object beam during the reading of the interferogram or work by retroreflection and separate by means of a semi-transparent plate the interferogram-carrying beam from the main object beam.

Thus, the use of wave coupling in a thick photosensitive electrooptical crystal makes it possible to provide a very simple interferometer for the study of vibrating or deformable structures. This device, whose basic diagram has been described relative to FIG. 5, lends itself to numerous variants and in exemplified manner three of these are described hereinafter.

Figure 6:
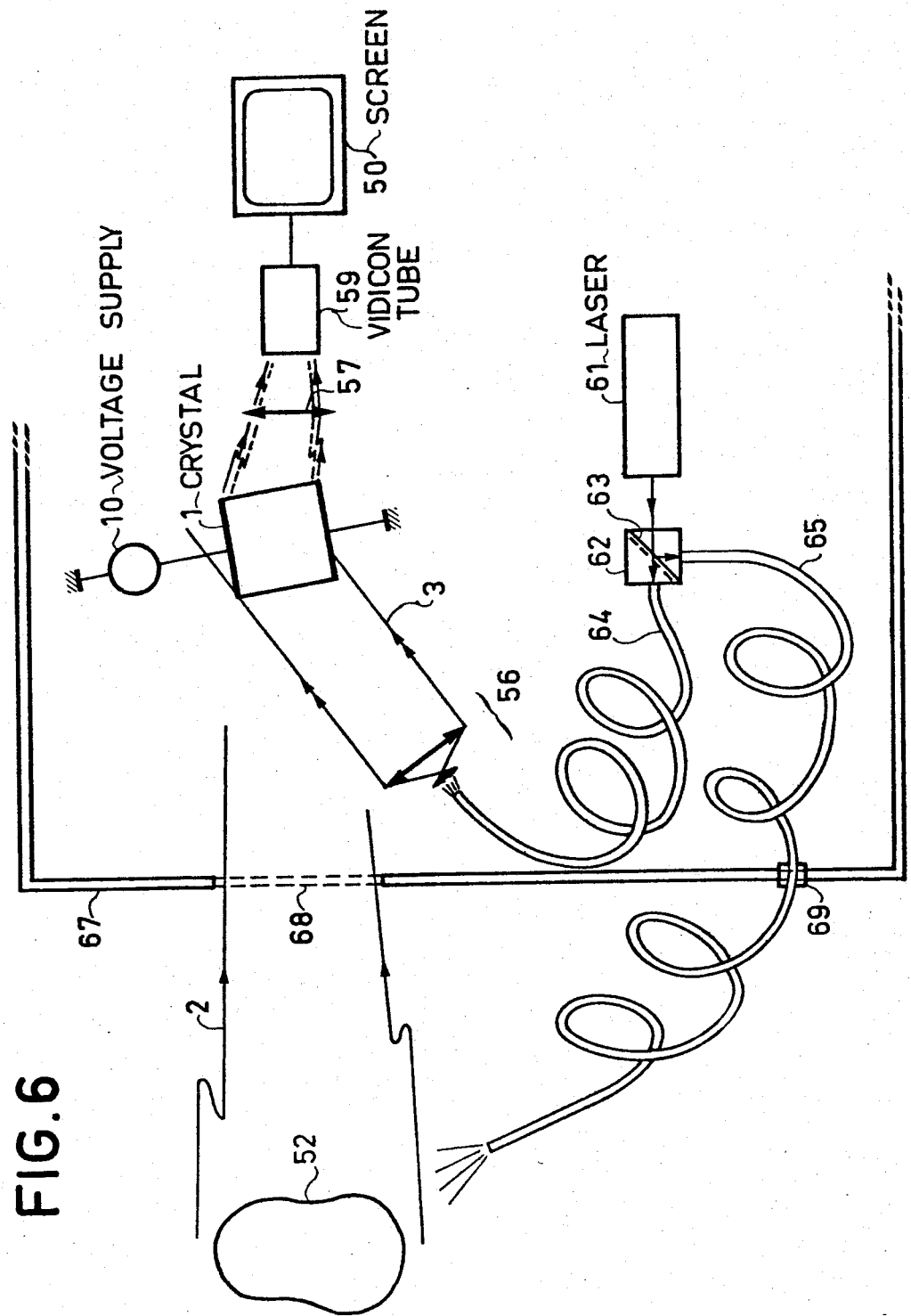
FIGS. 6 to 8 variants of the interferometer.

A first variant of this interferometer is shown in FIG. 6. In order to permit the study of vibrations of an object placed in an environment which is not compatible with the use of an optical measuring device, the object is illuminated by means of an optical fibre making it possible to move the interferometer away from the object and place it in an enclosure where there is a suitable atmosphere.

This variant has the main characteristics of the device described hereinbefore. The essential difference is in the way in which the object is illuminated and the way in which the reference beam is obtained. All the light energy used in the operation of the device is supplied by a laser 61. The beam supplied by this laser 61 is subdivided into two and coupled to two optical fibres 64, 65 via coupling means 62 comprising, for example, a semi-transparent plate 63. Fibre 65 is used for illuminating the vibrating object 52, which diffuses the object beam 2 to the interferometer. Optical fibre 64 carries the reference radiation to the entry face of the crystal. The reference radiation reaches the crystal along a parallel beam with a wide aperture after traversing the beam widener 56. The photosensitive electrooptical crystal 1, e.g. of BSO, is polarized about 10 kV.cm$^{-1}$ by voltage source 10, whose two terminals are connected to two electrodes, 6 and 7 carried by the two parallel faces of the crystal. Within the crystal and over its entire thickness, there is interference between object beam 2 and reference beam 3. The system of index layers forming the interferometric hologram of the vibrating object diffracts a fraction of the reference beam along the path of the directly transmitted object beam. The image of this hologram or interferogram is formed on the entry face of vidicon 59 via lens 57. This image can be displayed on screen 50.

In FIG. 6, it is possible to see the interferometer within an enclosure defined by a wall 67 provided with a window 68 permitting the passage of the object beam to the device, as well as a passage 69 for the optical fibre for illuminating the object.

Figure 7:
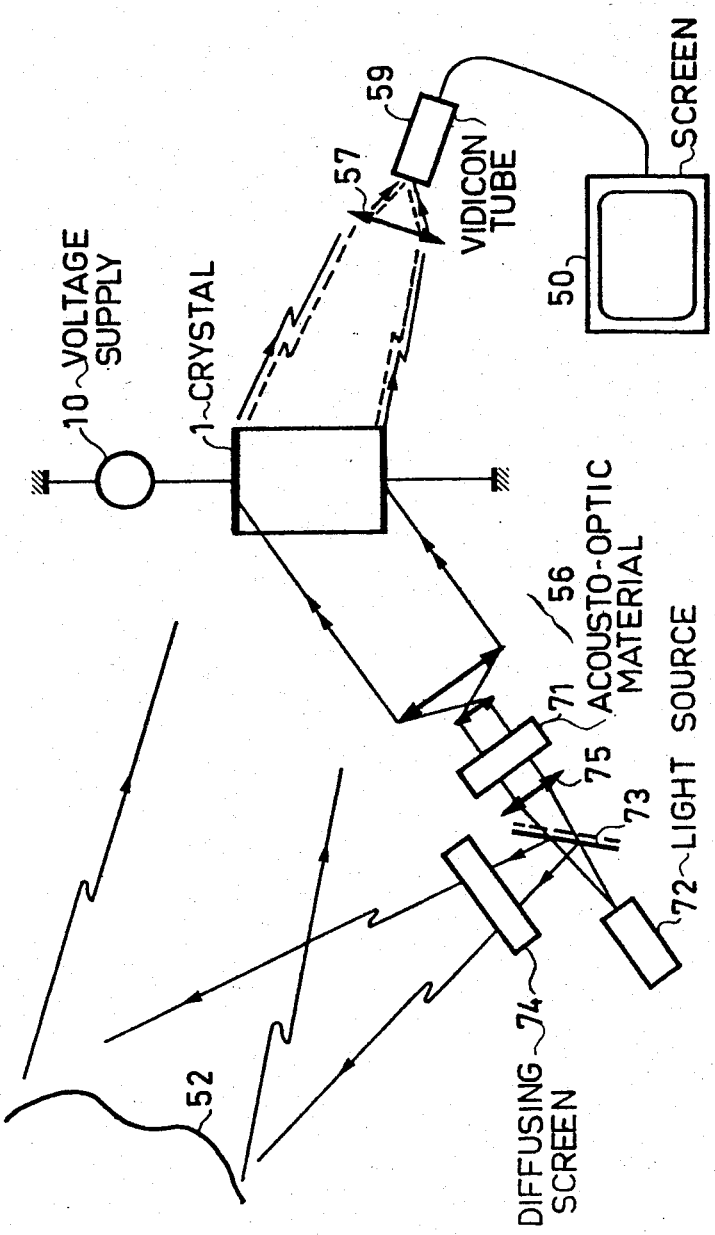

Another variant of this device or interferometer is shown in FIG. 7 in which the black fringes observed on the interferogram correspond to parts of the object which do not vibrate. For this purpose, there is a frequency displacement of the reference wave by a quantity equal to the vibration frequency of the object. The restored image then has black fringes corresponding to the zeros of the bessel function $$J_1^2 \left( \frac{4\pi}{\lambda} \Delta e \right).$$

The frequency displacement is obtained by placing an acousto-optical cell 71 on the path of the reference beam. According to this variant, the illumination beams for the object and the reference come from the same light source 72, e.g. a laser and are separated by the semi-transparent plate 73. The object illuminating beam is transmitted onto the object by means of diffuser 74. The object rediffuses it towards crystal 1. The reference beam from the semi-transparent plate 73 is collimated by lens 75, frequency-drifted by the acousto-optical cell 71, widened by beam widener 56 and transmitted onto crystal 1. The establishment of the hologram and the display of the interferogram take place in accordance with the procedure described hereinbefore namely formation of the image by means of lens 57 on entry face of vidicon 59 and display on screen 50.

Figure 8:
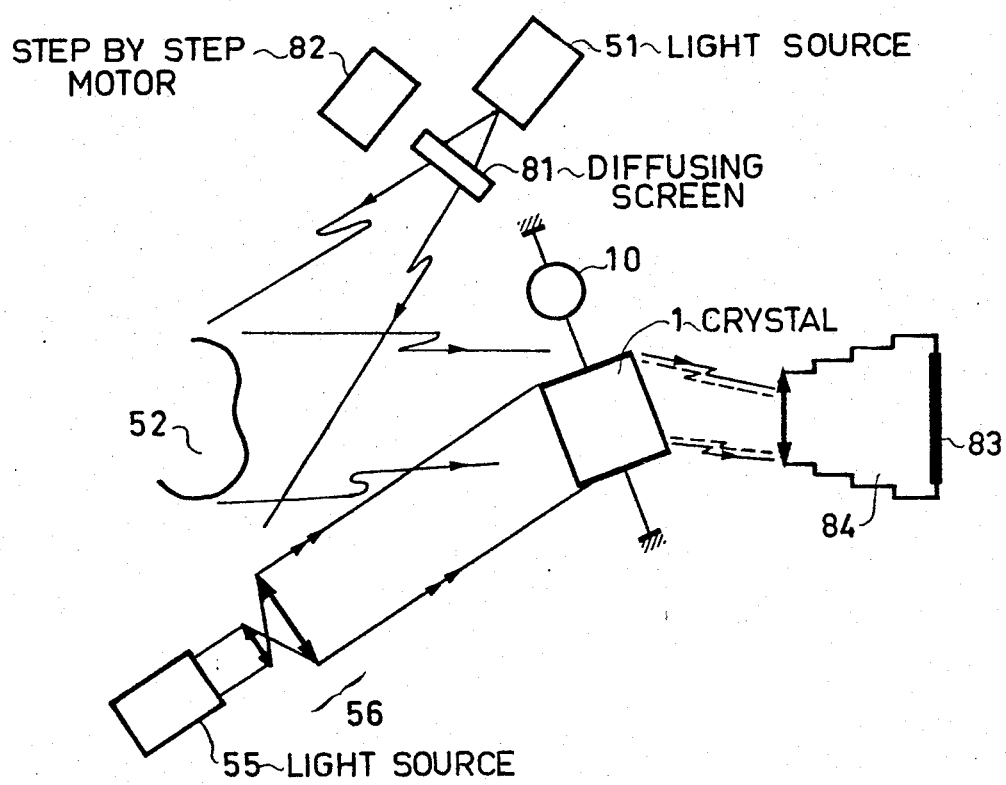

The use of coherent light in devices for forming object images has the disadvantage of speckle, i.e. a significant granulometry of the image, the grain diameter being a function of the numerical aperture of the optical device forming the image. The use of dynamic materials such as BSO makes it possible to integrate into the detection plane N images whose speckles are decorrelated and consequently increase the signal-to-noise ratio in proportion to $\sqrt{N}$. In practice, a mobile diffuser is interposed on the object illumination beam path. The device shown in FIG. 8 is substantially similar to that of FIG. 5 and has on the object illumination beam path a diffuser 81 operated by a stepping motor 82 with N steps.

The images formed on the sensitive film 83 of a instantaneous development camera 84 with an exposure time corresponding to N times the times $\tau$ for establishing the wave coupling. This leads to an interferogram of large objects, whilst benefiting from the properties of the coherent optics for the holographic recording, but with an image quality approaching that of incoherent optics.

The interferometer can also be used for the study of deformable objects undergoing random, noncyclic deformations. The interferogram is no longer a system of fixed fringes, whose characteristics are linked with the amplitude of the deformations, but it nevertheless gives information on the area of the object which deforms.

What is claimed is:

1. An interferometer for the real time display of deformations of a vibrating structure comprising:
   means for producing coherent radiation and directing said radiation onto said vibrating structure
   photosensitive electrooptical recording material for receiving coherent reference radiation and object radiation beams diffused by the said vibrating structure to record in volume and in real time, to within a time constant characteristic of the material, an interferomatic hologram constituted by a fixed system of index layers corresponding to the deformation of said vibrating structure and
   means for reading and displaying the interferomatic hologram recorded in said material from the object beam directly emerging from the recording material.

2. An interferometer according to claim 1, wherein the recording material is a bismuth and silicon oxide (BSO) monocrystal.

3. An interferometer according to claim 1, wherein the recording material is a bismuth and germanium oxide (BGO) monocrystal.

4. An interferometer according to claim 1, wherein the recording material is polarized by an electric field equal to or above 10 kV and orthogonal to the index layers.

5. An interferometer according to claim 4, wherein the electric field is directed in accordance with the normal to faces 001 of the monocrystal, the entry face of the radiation into the crystal being a face $\overline{1}10$ or a face 110.

6. An interferometer according to claim 1, wherein the reading and displaying means comprise a vidicon transmitting the image onto a display screen.

7. An interferometer according to claim 1, wherein the reading and displaying means comprise a instantaneous development camera.

8. An interferometer according to claim 1, wherein the object and reference radiation beams are carried by optical fibres.

9. An interferometer according to claim 1 further including an acousto-optical device positioned in the reference radiation beam and serving to supply a reference beam which is frequency-displaced relative to the object radiation beam by a frequency equal to or a multiple of the vibration frequency of the vibrating structure.

10. An interferometer according to claim 1 further including a rotary diffuser through which passes the object radiation beam during a time adequate relative to the time constant of the material to eliminate the speckle resulting from the use of coherent beams.

* * * * *